Dec. 4, 1928.  
O. R. SWEENEY  
BRINE TANK FOR WATER SOFTENERS  
Filed Sept. 9, 1926  2 Sheets-Sheet 1  
1,693,829

Inventor  
Orland Russell Sweeney  
By Wilson & McCanna  
Attys

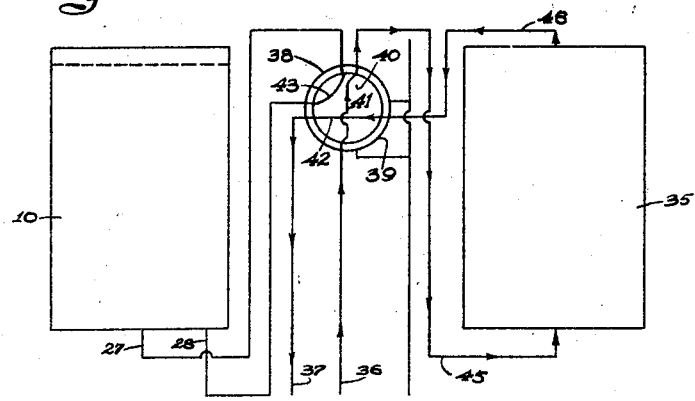
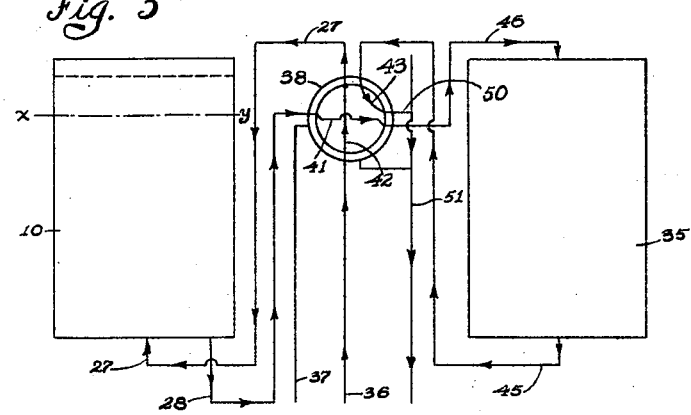
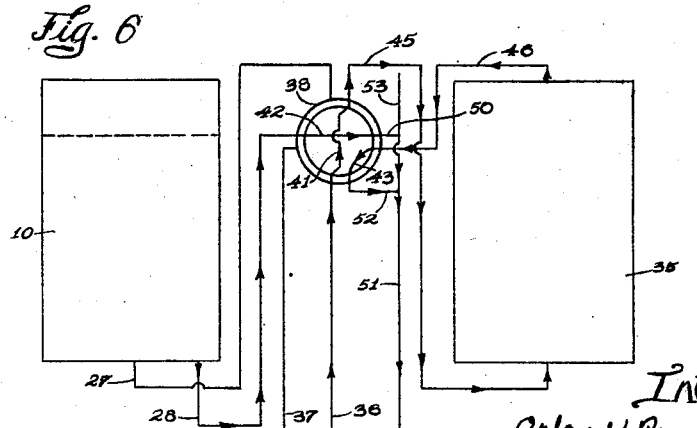

Patented Dec. 4, 1928.

1,693,829

UNITED STATES PATENT OFFICE.

ORLAND RUSSELL SWEENEY, OF AMES, IOWA, ASSIGNOR TO WARD-LOVE PUMP CORPORATION, OF ROCKFORD, ILLINOIS, A CORPORATION OF ILLINOIS.

BRINE TANK FOR WATER SOFTENERS.

Application filed September 9, 1926. Serial No. 134,342.

This invention relates to brine tanks for use in connection with base-exchange water softeners and more particularly those of the automatic or semi-automatic type.

Water softeners of the base-exchange type are reconditioned or regenerated from time to time by the passage of salt water or brine through the zeolitic material therein. In the case of small plants of the hand operated type, such as are suitable only for domestic use, the operation of regenerating is usually conducted by merely pouring in a certain amount of the salt or brine and carrying on the regeneration by manual manipulation of valves. In the case of automatic or semi-automatic plants where the regeneration must be taken care of without manual intervention except for the replenishing of the salt supply from time to time, it becomes necessary to provide a salt or brine tank of the type contemplated by the present invention wherein the brine is prepared in the intervals between regenerations so as to be in readiness for regenerating the softener when the occasion arises. A brine tank of this type, while particularly suited for use with automatic softeners, may be used in connection with large installations, automatic or otherwise, such as are used in laundries, hotels, and in the industries wherever large amounts of brine are required for the regenerating operations.

One of the principal objects of the invention is to provide a brine tank having a salt compartment and a brine compartment, the brine compartment being arranged to have communication with the salt compartment during the production of the brine and having a brine outlet arranged to communicate with a water softener and a fresh water inlet through which fresh water is introduced to displace the brine and thereby expel it from the brine tank for passage through the water softener.

Another object of the invention is to provide novel means operable under the pressure of the incoming fresh water to close communication between the brine compartment and the salt compartment, a special feature of said means being that it is positive in operation, simple in construction and not apt to require any attention after the same is installed.

Still another object is to provide a floatless brine tank having a top salt compartment, in which it is a simple matter to replenish the salt supply, and a bottom brine compartment, the two compartments being in communication through a port in the partition wall separating the same and through a tubular screen or diaphragm mounted over the port and affording access for the water in the brine compartment to the salt in the salt compartment over a considerable area to facilitate the production of brine.

With regard to the installation of the brine tank, an important object of the invention is the provision of a drain outlet at a predetermined desired level with respect to the brine tank, and valve means establishing communication therewith to permit lowering the level of water in the brine tank to the predetermined level of the outlet. This insures against any possibility of overflowing and wasting of brine when a certain stipulated amount of salt, predetermined for any given brine tank, is poured into the salt compartment. Previously it was necessary to provide an overflow drain on brine tanks and no precaution was taken to insure the maintaining of a definite water level in the tank. As a result there was a costly waste of brine on each occasion of replenishing the salt supply.

The invention is illustrated in the accompanying drawings, wherein—

Figure 2A:
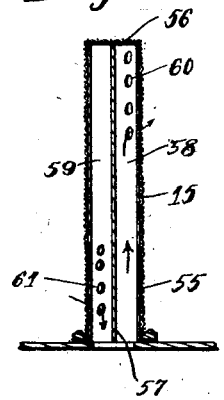
Fig. 2 is a fragmentary enlarged sectional detail of the valve controlling the communication between the salt compartment and brine compartment and illustrating the mode of operation thereof.
Figure 2:
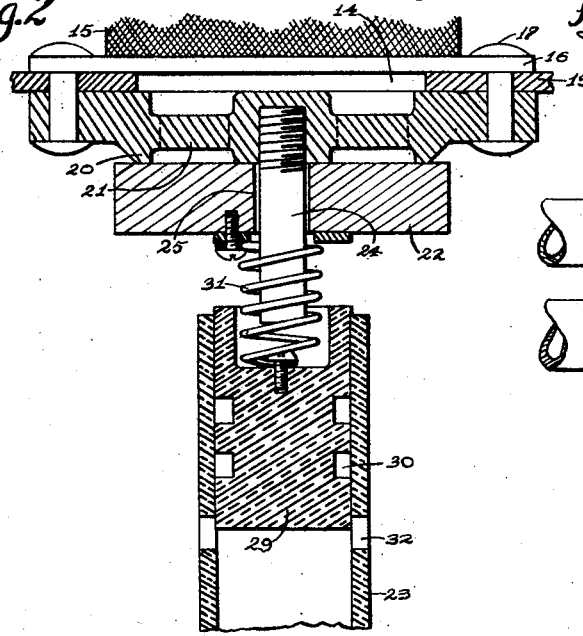
Figure 3:
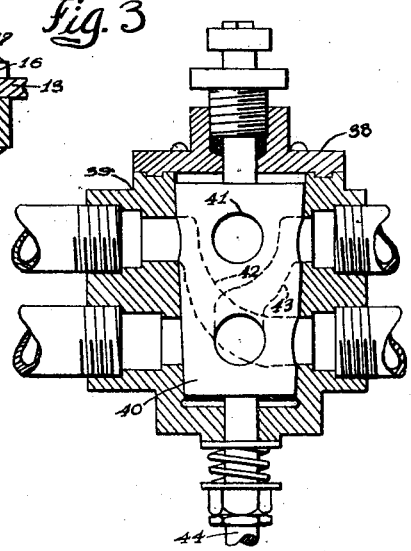

Fig. 2ª is a central vertical section through a screen or diaphragm of a modified construction incorporating means to aid in the better circulation between the salt and brine compartments;

Fig. 3 is a central vertical section through the main control valve used in connection with the brine tank in a water softener installation, as illustrated in Figs. 4 to 6; and Figs. 4, 5, and 6 are diagrammatic views of a water softener installation showing the brine tank in connection with the softener tank and a valve of the type shown in Fig. 3. Fig. 4 represents the connections established for normal softening operation, Fig. 5 represents the connections established for regenerating operation, and Fig. 6 represents the connections established for the flushing operation, of which the dropping of the level of water in the brine tank is an incident.

The same reference numerals are applied to corresponding parts throughout the views.

Figure 1:
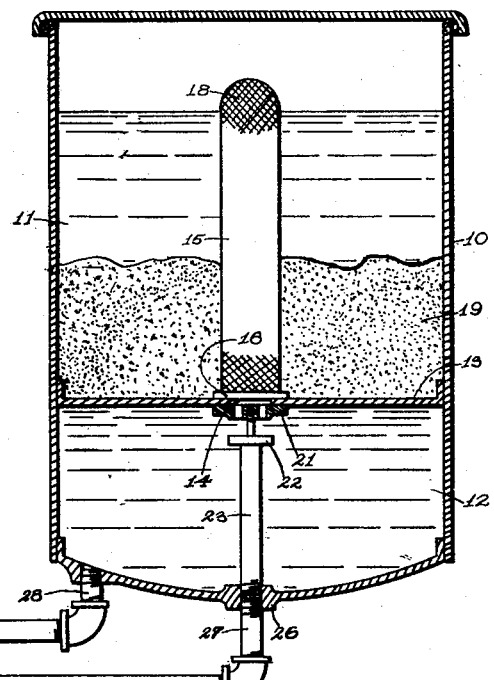
Figure 1 is a central vertical section through a brine tank embodying the present improvements.

Referring for the present more particularly to Figs. 1 and 2, the brine tank of the present invention is designated generally by the reference numeral 10 and comprises a receptacle having an upper salt compartment 11 and a lower brine compartment 12 separated by a partition wall 13. The brine compartment 12 is closed except for a port 14 provided in the partition wall 13 through which communication is established with the brine compartment 11. A screen 15, or other suitable diaphragm of an elongated tubular form, is mounted over the port 14 and suitably secured as by means of a ring 16 and rivets 17. The screen 15 is of appreciable height and extends nearly to the top of the salt compartment. The upper end thereof is closed as indicated at 18, to exclude any floating debris from the brine. Salt, as indicated at 19, is stored in the salt compartment on top of the wall 13 about the screen 15. The tank is initially filled with water to about the level indicated and this level, as will be pointed out hereinafter, is maintained, the thought being to avoid having the water level reach a point where an overflow would result if the usual stipulated charge of salt were poured in at a time when the salt supply had to be replenished. In other words, the head room in the compartment 11 above the water level should be equivalent approximately to the volume of salt to be poured in, at any given time. From the description thus far, it will appear that the communication established between the compartments 11 and 12 through the port 14 affords access for the water in the brine compartment 12 to the salt 19 over a considerable area as the salt is exposed to the action of the water about the screen 15 throughout the depth of the salt bed. There will obviously be a circulation induced as the water coming in contact with the salt, and becoming denser in proportion as it becomes saturated, it will seek a lower level and displace less saturated or fresh water. The latter, as a consequence, will rise centrally through the port 14. There will thus be a central rising column of fresh water or of less saturated solution and a falling circular column of denser or saturated solution. This circulation will carry on as long as any difference in saturation exists and eventually all of the water in the compartment 12 is converted into brine.

In Fig. 2ª I have shown a screen or diaphragm of modified or alternative construction having means to promote circulation between the brine and salt compartments. The screen 15 has a cylindrical sheet metal shell or casing 55 inserted therein and secured therewith in any suitable manner over the port 14 on top of the partition wall 13. The shell 55 is closed at the top as indicated at 56 and has a central partition wall 57 dividing the same into two passages 58 and 59. The passage 58 opens through the screen 15 at its upper end through a plurality of openings 60 while the passage 59 opens through the screen 15 at the lower portion thereof through a plurality of openings 61. In operation, the fresh water or less dense solution will be constantly displaced by the brine or denser solution and, as a result, there will be a rising column in the passage 58, as indicated by the arrows, as the fresh water or less dense solution is displaced upwardly. This solution enters the salt compartment through the openings 60. As the solution dissolves the salt, it becomes heavier and settles to the bottom of the salt compartment and eventually passes through the openings 61, as indicated by the arrows, and flows downwardly in the passage 59 into the brine compartment. Obviously such induced circulation will continue so long as any appreciable difference in the density of the solution in the two compartments exists.

The port 14 has a valve seat 20 provided on a spider element 21 riveted by its rim portion to the under side of the partition wall 13, suitably by means of the rivets 17 previously referred to. A valve disk 22 is arranged to close the port 14 by rising up into engagement with the seat 20, as shown in Fig. 2. The valve disk 22, however, normally rests on the top of a pipe 23 in spaced relation to the seat 20, being arranged to drop by gravity to the normal inoperative position shown in Fig. 1. A guide stem 24 threading in the hub of the spider 21 and depending therefrom extends through a central opening 25 provided in the valve disk and serves thereby to guide the valve in its movement to and from its seat and to prevent displacement thereof from the top of the pipe 23. The pipe 23 is threaded in the bottom 26 of the brine tank to communicate with a fresh water inlet pipe 27. Another pipe 28 communicating with the bottom of the brine compartment serves as an outlet for the brine and is arranged to communicate with the water softener tank served by the brine tank. The pipe 23 serves as a cylinder in which a piston 29 is arranged to reciprocate. The piston 29 has a fairly close fit within the pipe 23 and is also provided with annular grooves 30 to give a liquid seal against the possible by-passing of the water around the piston in operation. Both the piston 29 and the pipe 23, which serves as its cylinder, are made preferably of bakelite material in order to withstand the corrosive action of the brine in the compartment 12. The likelihood of the piston sticking is in this way reduced to a minimum. This precaution is particularly necessary in view of the fact that the piston is operated only at appreciable intervals and might otherwise tend to rust tight in its cylinder. The piston 29 preferably has a resilient connection with the valve 22, as by means of a coiled compression spring 31. The spring 31 in operation is placed under compression by the piston 29 under the action of the incoming water after the valve 22 has been forced upwardly against its seat. Ports 32 are provided in the walls of the pipe 23 at such an elevation as to insure appreciable compression of the spring 31 by the piston 29 before the ports 32 are uncovered. The ports 32 serve as outlets for the fresh water entering through the inlet 27. It will thus appear that when the valve, hereinafter to be described, affording communication between a source of water supply under pressure and the inlet 27 is opened, the piston 29 is forced upwardly and seats the valve 22 in the manner illustrated in Fig. 2. The piston 29 after raising the valve to its seat is forced to move an additional amount before uncovering the ports 32 so that the spring 31 is placed under compression and the valve 22 is thereby held securely seated. The fresh water issuing from the ports 32, which by the way are near the top of the brine compartment, causes the brine in the compartment to be displaced downwardly so that brine is forced through the softener tank with which the pipe 28 is connected. The displacement laterally and vertically of the fresh water inlet relative to the brine outlet insures the complete exhaustion of the brine from the compartment 12 and the replacement thereof by fresh water. The amount of brine displaced will obviously be proportionate to the amount of fresh water introduced. Obviously, there is nothing in the operation tending to diminish the total volume of liquid in the brine tank. As soon as the valve above mentioned is closed to discontinue the flow of fresh water, the piston 29 will drop, initially under the action of the spring 31 and thereafter under the action of gravity, as will also the valve 22. The latter eventually comes to rest on top of the pipe 23. The ports 32 are, of course, closed in the descent of the piston 29 while the port 14 is opened in the descent of the valve 22. Communication being re-established between the compartments 11 and 12, the fresh water which has entered the brine compartment will immediately commence action on the salt 19 in the manner above described to form another charge of brine for the succeeding regenerating operation.

Referring now to Figs. 3 to 6, it will be seen that the brine tank 10 forms a part of a water softener installation including a water softener tank 35 having a water supply line 36 and service system 37 connected therewith through a valve 38. This is in accordance with the disclosure in Harwood et al., Patent 1,593,300, issued July 20, 1926. The valve fully described and claimed in said patent comprises a body 39 and a rotatable plug 40. The plug 40 has three ports 41, 42, and 43 provided therein in the manner shown in Fig. 3 and as diagrammatically indicated in Figs. 4, 5, and 6. The body 39 of the valve has ports arranged to register with these ports in the different successive positions to which the plug 40 is arranged to be shifted. The operation of the valve plug 40 may, obviously, be manual, automatic, or semi-automatic. The operating means in either case is connected with the stem 44. It is believed this brief description will suffice for a general understanding of the valve 38 so that ont may intelligently follow the description of the water softener installation under the three conditions illustrated by Figs. 4, 5, and 6, namely, the normal softening operation, the regenerating operation, and the flushing operation.

In the normal softening operation, communication is established between the water supply line 36 and the service system communicating with the line 37 through the softener tank 36 as follows: From the supply line 36, through the port 41, through pipe 45 into the bottom of the softener tank 35 for passage upwardly through the mineral therein for softening. Leaving the tank through pipe 46 the softened water passes through port 42 of the valve 38 into the service line 37. This operation continues for a predetermined capacity run after which the exhausted mineral in the tank 35 has to be regenerated.

In the regenerating operation, the valve 38 has the plug 40 thereof shifted, as shown in Fig. 5, to a position 90° advanced from the normal position shown in Fig. 4. Communication is thus establshed between the water supply line and the softener tank by way of the brine tank, as follows: From the supply line 36, through port 42 in the valve 38, through the pipe 27 into the brine compartment in the bottom of the brine tank 10. The operation of the brine tank having been described above, it will be clear that an amount of brine proportionate to the amount of entering fresh water will be forced to issue from the brine tank through the brine outlet pipe 28. This brine is conducted through port 41 in the valve 38 and thence through pipe 46 into the top of the softener tank 35 for passage downwardly through the mineral therein. The mineral is revived by the action of the brine in a manner well known in this art and the spent brine issuing from the lower part of the tank passes through pipe 45 and through port 43 in the valve 38 through a drain outlet 50 and thence through a waste outlet 51 to the sewer. The location of the drain outlet 50 as respects its elevation relative to the brine tank should here be noted. Assuming that the salt supply in the brine tank 10 has just been replenished so that the water level therein is at the point indicated by the dotted lines in Figs. 4 and 5 very near the rim of the tank, it will presently be made clear how the level is made to drop to the dot and dash line XY, shown in Fig. 5, which corresponds to the level of the drain outlet 50.

Upon the completion of the regenerating operation during the course of which a predetermined amount of brine is caused to pass through the softener tank at a predetermined rate, the mineral in the softener tank is flushed by the violent passage of fresh water therethrough in a reverse direction to the flow of brine, that is, in the same direction as the normal softening flow. The valve 38 has the plug thereof shifted to the position shown in Fig. 6, 90° advanced from that shown in Fig. 5, to establish the following circuits: From the supply line 36 through the port 41 of the valve 38 and through pipe 45 into the bottom of the softener tank 35. The water passes upwardly through the mineral and is thereby softened. Whatever hard water may be in the head space above the mineral in the softener tank 35 will be displaced by the rising column of soft water out through the pipe 46. From the pipe 46 the water passes through port 43 in the valve 38 through pipe 52 into the waste outlet 51 and thence to the sewer. Upon the completion of the flushing operation the system is obviously cleared of any hard water so that when the valve 38 is turned through 180° back to the position shown in Fig. 4 to recommence the softening operation there will be no hard water introduced in the service system. A parallel circuit is established through the valve 38 in the flushing operation by virtue of which the water level in the brine tank is lowered to the level of the drain outlet 50. This circuit is as follows: The brine outlet 28 communicates through the port 42 of the valve 38 with the drain outlet 50 which, as described above, communicates with the waste outlet 51. Fresh water which has just previously been injected into the brine compartment during the regenerating operation is caused to flow the circuit described until the level of the liquid in the brine tank has dropped to the level of the drain outlet 50. Any resistance to flow of the water due to pipe friction is easily overcome by the injector action resulting from the violent flow of the flushing water passing through the waste outlet 51 so that the water level in the brine tank is quickly brought down to the level of the drain outlet. There can be no siphoning action to cause the level to drop farther since the drain outlet 50 has a vent pipe 53 extending therefrom to a point above the level of the brine tank. Obviously, since the water level in the brine tank is maintained at the predetermined level of the drain outlet 50 so that a definite head space is left in the salt compartment above the water level therein, there is no need for an overflow to the sewer since there is always sufficient space left to receive the usual salt charge without the likelihood of there being an overflow. In previous types of brine tanks it was customary to provide an overflow on the brine tank and, on each occasion of charging the tank with a fresh supply of salt, twenty or thirty gallons of brine passed out through the overflow and were wasted. Such a loss is entirely obviated by the simple expedient just described and it will be noted that the water caused to drain from the brine tank is fresh water and not brine since the water removed from the brine tank is taken from the brine compartment almost immediately after the regenerating operation when the brine compartment contains only fresh water.

It is believed that the foregoing description is sufficiently clear and complete to afford enough of an understanding of the purposes and operation of the present invention that anyone versed in the art and acquainted with the problems with which the present invention deals could make and use the invention to good advantage.

I claim:

1. In a water softener installation, the combination with a water softener tank, of a brine tank having a top salt compartment and a bottom brine compartment normally in communication, a pipe leading from the latter compartment thereof, a drain outlet at a predetermined level near the level of the top of said salt compartment, and means normally serving to control communication between the softener and brine tanks, said means being adapted for opening communication between said pipe and said drain outlet to lower the level of water in said brine tank to the predetermined level of said outlet for the purpose described.

2. In a water softener installation the combination with a water softener tank, of a brine tank having an upper salt compartment and a lower brine compartment normally in communication with one another, a valve normally serving to control communication between the softener and brine tanks, and also arranged to establish communication between said brine compartment and a source of water supply, and a drain outlet at a predetermined level near the level of the top of said salt compartment, said valve being arranged to establish communication between said brine compartment and said outlet to lower the level of water in said brine tank to the predetermined level of said outlet for the purpose described.

3. In a water softener installation, the combination with a water softener tank, of a brine tank having a top salt compartment and a bottom brine compartment normally in communication with one another, the latter having an inlet and an outlet, a drain outlet at a predetermined level near the level of the top of said salt compartment arranged to be placed in communication with said outlet to lower the level of water in said brine tank to the predetermined level of said drain outlet, and valve means normally serving to control communication between the softener and brine tanks, and also arranged at one time in each cycle of operations of the softener to open communication between the inlet and a source of water supply and arranged at another time in said cycle to open communication between said tank outlet and said drain outlet.

4. In a water softener installation, a water softener tank, a source of water supply therefor, a service system supplied thereby, a brine tank, valve means serving to establish communication normally between said water supply and said service system through said softener tank but arranged to establish communication between said softener tank and said brine tank whereby to supply brine to the softener tank, and a drain outlet arranged at a predetermined level near the level of the top of said brine tank, said valve means being arranged to establish communication between said brine tank and said drain outlet whereby to lower the level of water in said tank to the predetermined level of said outlet for the purpose described.

5. In a water softener installation the combination of a water softener tank, a source of water supply, a service system, a brine tank having a fresh water inlet and a brine outlet, valve means for controlling the communication betwen said source of water supply and said service system through said softener tank and arranged to control the communication betwen said source of water supply and the fresh water inlet of said brine tank as well as betwen the brine outlet of said brine tank and said softener tank whereby brine is caused to pass through said softener tank from the brine tank, and a drain outlet at a predetermined level near the level of the top of said brine tank, said valve means being arranged to establish communication between the brine outlet of said brine tank and said drain outlet whereby to lower the level of water in said tank to the predetermined level of said outlet for the purpose described.

6. In combination, a water softener tank, a brine tank having an upper and a lower compartment, the upper compartment being arranged to contain salt and being normally in communication with the lower compartment, an inlet and an outlet for said tank communicating with the lower compartment, a source of water supply, valve means arranged to establish communication between said source of water supply and the tank inlet and between the tank outlet and said water softener whereby to supply brine from the lower compartment of said brine tank to said softener tank by displacing the brine in said compartment by fresh water, and a drain outlet at a predetermined level near the level of the top of said brine tank, said valve means being arranged to establish communication between the brine tank outlet and said drain outlet when the lower compartment of said brine tank is charged with fresh water, whereby to lower the level of water in the upper compartment of said tank to the predetermined level of said outlet for the purpose described.

7. In a water softener installation, the combination of a water softener tank, a source of water supply, a service system, valve means for normally establishing communication between said water supply and said service system through said softener tank, a brine tank for regenerating the softener tank, said valve means being arranged to establish communication from said water supply through said brine tank to said softener tank to cause the passage of brine from the brine tank to the softener tank for regeneration, a waste outlet, said valve means being arranged to establish communication from said water supply through said softener tank to said waste outlet for flushing said softener tank, and a drain outlet disposed at a predetermined level near the level of the top of said brine tank having communication with said waste outlet and arranged to be placed in communication with said brine tank during the flushing operation of the softener tank whereby to lower the level of water in the brine tank to the predetermined level of said drain outlet.

8. In a water softener installation as set forth in claim 7, the provision of said drain outlet disposed in such relation to said waste outlet whereby advantage is taken of an injector action produced on the drain outlet by the action of the flushing water passing through the waste outlet to hasten the lowering of the level of the water in the brine tank.

9. In a system of the character described, the combination with a water softener tank, of a tank for dissolving material, such as salt, having a material compartment adapted to contain soluble material and a liquid compartment, means establishing communication between said compartments to afford access for the liquid to the material to dissolve the same, an inlet for the liquid compartment, an outlet for said compartment, and means whereby communication between said compartments is closed during the introduction of liquid to the liquid compartment through said inlet whereby solution in the liquid compartment is arranged to be expelled therefrom to the softener tank through said outlet.

10. In a tank for dissolving material, such as salt, a receptacle having a material compartment and a liquid compartment, a port normally establishing communication between said compartments to afford access for the liquid to the material to be dissolved, a valve controlling said port, an inlet for said liquid compartment, an outlet therefor, and means connected with said valve arranged to be operated in the introduction of liquid into said liquid compartment through said inlet whereby to operate said valve and close communication between said compartments.

11. In a tank of the character described, a receptacle having an upper material compartment and a lower liquid compartment, a port establishing communication between said compartments to afford access for the liquid to the material, a valve for controlling said port, said valve being arranged normally to move by gravity downwardly away from said port, an outlet for said tank communicating with the liquid compartment, and an inlet communicating with the same compartment, said valve being arranged to be lifted toward closed position under the action of the incoming liquid to close communication between said compartments during the introduction of liquid to said liquid compartment.

12. In a water softener installation, the combination with a softener tank, of a receptacle having an upper material compartment and a lower liquid compartment separated by a partition wall, an inlet and an outlet for the lower compartment, an opening provided in said partition wall for establishing communication between said compartments, means for closing said opening during the introduction of water into the lower compartment through said inlet whereby solution in said compartment is arranged to be expelled therefrom to the softener tank through said outlet, a tubular screen mounted over said opening to retain the material in the material compartment against passage bodily through said opening into said liquid compartment while preserving the aforesaid communication between said compartments, and means in said screen dividing the space therein into an upflow passageway and a downflow passageway for the purposes described.

13. In a water softener installation, the combination with a softener tank, of a receptacle having an upper material compartment and a lower liquid compartment separated by a partition wall, an inlet and an outlet for the lower compartment, an opening in said partition wall for establishing communication between said compartments, means for closing said opening during the introduction of water into the lower compartment through said inlet whereby solution in said compartment is arranged to be expelled therefrom to the softener tank through said outlet, a tubular screen mounted over said opening to retain the material in the material compartment against passage bodily through said opening into said liquid compartment while preserving the aforesaid communication between said compartments, said screen extending an appreciable height in the material compartment nearly to the upper end of the latter and having its upper end closed, and means provided in connection with said screen facilitating currents in opposite directions therethrough, said means providing laterally opposed inlet and outlet openings disposed respectively at opposite ends of said screen for the purposes herein described.

14. In a brine tank, a liquid receptacle having a salt pocket therein, a valve controlling access to said pocket for the liquid in said receptacle, an outlet for said receptacle, an inlet for said receptacle, a piston device having connection with said valve for operating the same, and a cylinder for receiving said piston communicating with said inlet and discharging into said receptacle whereby said valve is operated to closed position by said piston device during the introduction of liquid through said inlet into said cylinder and from thence into said receptacle.

15. In a brine tank, a liquid receptacle having a salt compartment and a brine compartment, a valve serving to control communication between said compartments, said valve normally tending to move to open position, an outlet for said brine compartment, a fresh water inlet, a piston device connected with said valve to operate the same to closed position against its tendency to move to open position, and a cylinder having said piston reciprocable therein, said cylinder being in communication with said inlet and having ports providing communication with said liquid compartment arranged to be uncovered in the movement of said piston device.

16. In a brine tank as set forth in claim 15, the provision of a compression spring in the connection between said valve and said piston device, said spring being arranged to be compressed under the action of said piston device before the uncovering of the ports provided in said cylinder whereby to securely seat said valve.

17. In a brine tank, an upright liquid receptacle having an upper salt compartment and a lower brine compartment separated by a partition wall, a port provided in said wall establishing communication between said compartments, a valve for closing said port, a piston device for operating said valve, an upright cylinder within said brine compartment beneath said valve having said piston operable therein, said valve being arranged normally to drop by gravity away from said port and being arranged to rest on the top of said cylinder, an outlet for said brine compartment, and a fresh water inlet therefor communicating with said cylinder.

18. In a brine tank as set forth in claim 17, the provision of a resilient connection between said valve and said piston arranged to be compressed in the operation of said piston to securely seat the valve, the port in said cylinder being arranged to be uncovered only when said connection is placed under compression by the movement of said piston to the proper position.

19. In a brine tank as set forth in claim 17, the provision of a guide for said valve for the movement thereof between its open and closed positions.

20. In a brine tank, a liquid receptacle having a salt compartment and a brine compartment, a valve controlling comunication between said compartments, a cylinder in said brine compartment, a piston operating in said cylinder and having connection with said valve to operate the same, said piston and cylinder being of bakelite material to withstand the action of the brine in said brine compartment, and an inlet and outlet for said brine compartment, said inlet having communication with said cylinder whereby the piston is operated under the action of the pressure of the entering water.

21. In a brine tank, a liquid receptacle having an upper salt compartment and a lower brine compartment separated by a partition wall, a port provided in said wall affording communication between said compartments, a valve disk for closing said port, a screen covering said port to retain the salt in the salt compartment, a spider element mounted over said port having a guide stem depending therefrom, said valve disk having an opening to receive said stem whereby to be guided in its movement toward and away from said port, a cylinder in said brine compartment beneath said port terminating in spaced relation thereto at its upper end, a piston reciprocable in said cylinder and having connection with said valve disk for operating the latter, a brine outlet for said brine compartment, and a fresh water inlet for said compartment, said inlet communicating with said cylinder and said cylinder having a port in the wall thereof for discharging fresh water entering at said inlet into said brine compartment.

22. In a brine tank as set forth in claim 21, the provision of a coiled compression spring providing the connection between said piston and said valve disk, said cylinder having a port arranged to be uncovered by said piston only when said spring is placed under compression whereby said valve disk is firmly seated.

23. In a brine tank, a liquid receptacle having an upper salt compartment and a lower brine compartment, the latter compartment being closed with the exception of a port providing restricted communication between said compartments, a valve for closing said port to seal the brine compartment in closed communication with respect to the salt compartment, a brine outlet for said brine compartment disposed at one side thereof, a fresh water inlet spaced from said outlet toward the opposite side of said compartment, and means insuring the closing of said valve during the introduction of fresh water through said inlet into said brine compartment.

24. In a brine tank, a liquid receptacle having an upper salt compartment and a lower brine compartment, the latter compartment being closed with the exception of a port providing restricted communication between said compartments, a valve for closing said port to seal the brine compartment in closed communication with respect to the salt compartment, a fresh water inlet centrally disposed with respect to said brine compartment, means operable upon the introduction of fresh water through said inlet to close said valve, and a brine outlet disposed near the side of said brine compartment.

25. In a brine tank as set forth in claim 24, the provision of a pipe for said fresh water inlet extending therefrom and having a discharge port near the top of said brine compartment.

26. In a brine tank, a liquid receptacle having an upper salt compartment and a lower brine compartment, the latter compartment being closed with the exception of a port providing restricted communication between said compartments, a valve for closing said port to seal the brine compartment in closed communication with respect to the salt compartment, a fresh water inlet for said brine compartment discharging therein near the top of said compartment, and a brine outlet for said compartment exhausting the same near the bottom thereof.

27. In a brine tank, a liquid receptacle having an upper salt compartment and a lower brine compartment, the latter compartment being closed with the exception of a port providing restricted communication between said compartments, a valve for closing said port to seal the brine compartment in closed communication with respect to the salt compartment, a fresh water inlet for said brine compartment discharging therein near the top of said compartment, and a brine outlet for said compartment exhausting the same near the bottom thereof, the outlet being near one side of said compartment and the inlet being spaced therefrom toward the other side of said compartment.

28. In a brine tank, a liquid receptacle having an upper salt compartment and a lower brine compartment separated by a partition wall, an opening provided in said wall for establishing communication between said compartments, a hollow casing mounted over said opening and extending an appreciable height in said salt compartment, said casing having a central vertical partition therein providing two passages and having an opening at the upper portion of one passage and an opening at the lower portion of the other passage establishing communication between said brine compartment and said salt compartment, and screen covering said openings to retain the salt in the salt compartment.

29. In a brine tank, a liquid receptacle having an upper salt compartment and a lower brine compartment separated by a partition wall, said wall having an opening therein establishing communication between said compartments, and a perforated diaphragm device mounted over said opening to retain the salt in the salt compartment while preserving the aforesaid communication between said compartments, said diaphragm device having a partition wall therein providing for upflow of liquid therein on one side and down flow on the other side and said device opening into said brine compartment at the upper portion of the upflow passage and at the lower portion of the downflow passage.

30. In a brine tank, a liquid receptacle having an upper salt compartment and a lower brine compartment separated by a partition wall, said wall having an opening therein establishing communication between said compartments, a tubular screen mounted over said opening for retaining the salt in the salt compartment while preserving the aforesaid communication between said compartments, and a casing having an opening at its upper portion on one side and an opening in the lower portion thereof at its opposite side serving to limit the circulation of liquid between the salt and brine compartments through said screen to said openings whereby less dense solution or fresh water passes out through the upper opening in said casing into said salt compartment and brine or denser solution leaves said salt compartment through the lower opening in said casing for passage into the brine compartment.

31. In a brine tank as set forth in claim 30, the provision in said casing of a baffle wall dividing the same into two passages leading to and from said openings.

In witness of the foregoing I affix my signature.

ORLAND RUSSELL SWEENEY.